Dec. 8, 1964 R. HAUG 3,159,894
SPRING CLIP ASSEMBLY
Filed March 25, 1964
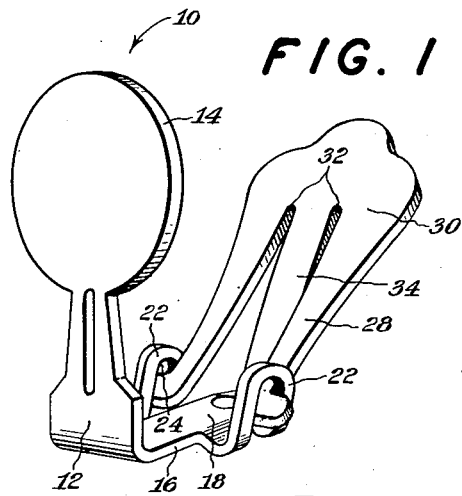
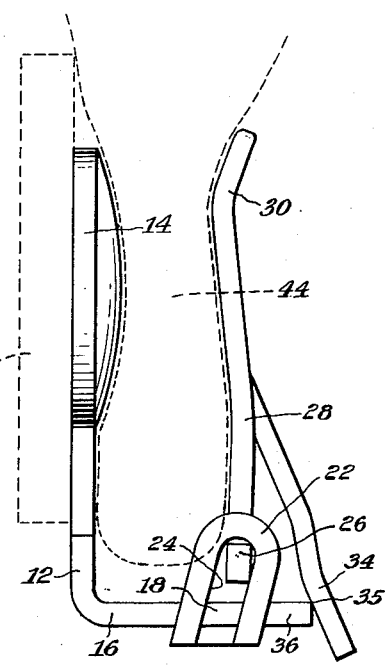
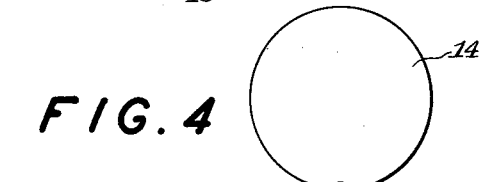
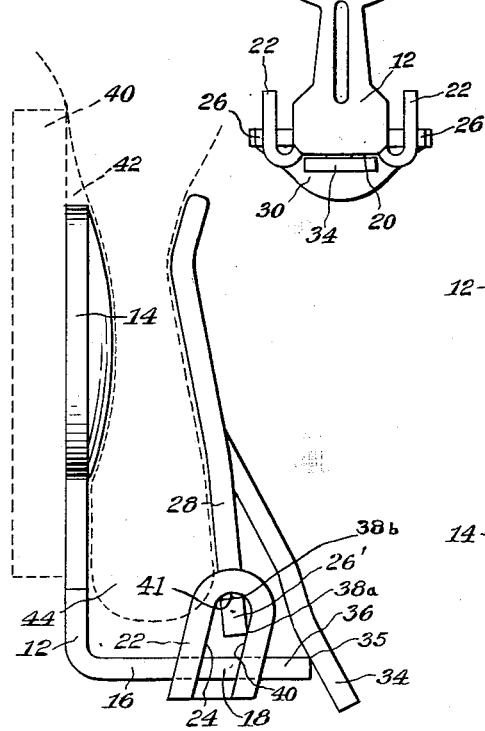
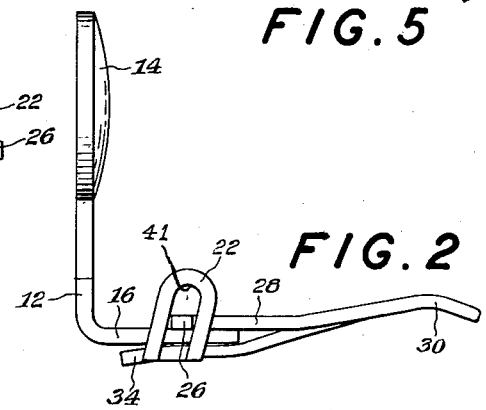
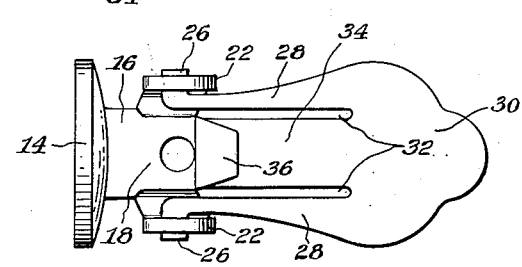
INVENTOR.
RICHARD HAUG

United States Patent Office 3,159,894
Patented Dec. 8, 1964

3,159,894
SPRING CLIP ASSEMBLY
Richard Haug, 303 Peninsula Blvd., Lynbrook,
Long Island, N.Y.
Filed Mar. 25, 1964, Ser. No. 354,523
4 Claims. (Cl. 24—252)

This invention relates to spring clips and, more particularly, to spring clips for securing articles upon support members.

It is an object of the present invention to provide a spring clip for frictionally securing an article upon a support member.

A more specific object of the present invention is to provide a spring clip assembly for earrings, which will provide for the comfortable and secure support of earrings upon ear lobes of various sizes.

Another important object of the present invention is to provide a spring clip assembly for earrings and the like, having manually adjustable pressure means for conveniently adjusting the holding pressure of the spring clip assembly, to minimize shifting and displacement thereof.

Another important object of the present invention is to provide a spring clip assembly of the type described having two basic parts readily assembled by conventional manufacturing methods, to provide a spring clip assembly which can be conveniently adjusted to provide adjustment of the spring pressure upon the support member.

An additional object of the present invention is to provide a spring clip assembly which can be opened to completely relieve the spring tension, to allow for the attachment of the assembly to another article, such as an earring ornament, by the application of heat, solder, etc., thus avoiding loss of spring tension due to annealing.

All of the foregoing and still further objects and advantages of this invention will become apparent from a study of the following specification, taken in connection with the accompanying drawing, wherein:

FIGURE 1 is a perspective view of a spring clip assembly made in accordance with the present invention in a partially open position;

FIGURE 2 is a side elevational view of the spring clip assembly shown in FIGURE 1 in a completely open position;

FIGURE 3 is a top plan view of the assembly shown in FIGURE 2;

FIGURE 4 is a left end view of the spring clip assembly shown in FIGURE 2;

FIGURE 5 is an enlarged side elevational view of the spring clip assembly shown in FIGURE 1, in actual use with an earring ornament mounted thereupon and in an initial position upon an ear lobe; and FIGURE 6 is a view similar to FIGURE 5, showing the manner in which the spring pressure is adjusted.

Referring now to the drawing, a spring clip assembly 10 made in accordance with the present invention is shown to include a base member 12 having a mounting portion 14 at one end and an offset portion 16 at the opposite end. The offset portion 16 includes an extension 18 which is downwardly concave to form a downwardly opening recess 20, for purposes hereinafter more fully described. The sides of the offset portion 16 include a pair of laterally spaced apart ears 22, each having an aperture in the form of a slot 24 for pivotally and slidably receiving pintles 26 formed upon the end of a pair of side arms 28 of a pressure member 30.

The pressure member 30 has a pair of laterally spaced apart longitudinal slots 32 defining a central leaf spring 34 which is free at one end and in abutment with an extension 36 of the offset portion 16 of the base member 12.

As is more clearly shown in FIGURES 5 and 6 of the drawing, each pintle 26 has two edges 38a, b, which are in sliding engagement with one side 40 of the respective slot 24, which engagement frictionally resists sliding movement of the pintle within its respective slot. The abutment extension 36 is also provided with an edge 35 which is in frictional sliding engagement with the facing side of the leaf spring 34, which engagement frictionally resists sliding movement of the leaf spring 34 relative to the extension abutment 36.

As may be observed from FIGURES 5 and 6 of the drawing, the mounting portion 14 and upper end of the pressure member 30 defines a jaw, between which a support member, such as an ear lobe 44 may be received. The holding pressure of the assembly upon the support member may be increased by manually squeezing the base member 12 and the pressure member 30. This causes the pressure member 30 to shift relative to the base member, from the initial position shown in FIGURE 5, to the adjusted position shown in FIGURE 6. In the adjusted position, the pintles 26' are slightly displaced within the slots 24, causing the upper edges 38 to engage the arcuate portions 41 of the slots 24. This also effects the slight displacement of the spring 34 relative to the abutment 36 and enlarges the angle of attack between the edges 38a and the sides 40 of the slots 24. These changes in position of the parts increase the frictional resistance to return movement of the pressure member, thus increasing the holding pressure upon the jaw formed by the mounting portion 14 and the pressure member 30. The parts are thus held in this slightly displaced position, following the manual squeezing of the parts, by the frictional engagement of the edges 38a, b of the pintles 26 with the sides 40 and arcuate surfaces 41 of the slots 24, and the edge 35 of the abutment with the facing surface of the leaf spring 34. The magnitude of this frictional restraining action upon the displaced pressure member depends upon the surface characteristics of the respective portions, which may be varied at will.

The inclination of the slots 24 and, more specifically, of the surfaces 40, compounds the effect of slight rotational displacement of the pressure member, to provide through the aforementioned displacement of the parts, sufficient holding pressure to maintain the parts in the manually displaced position.

In the fully opened position of the clip assembly, as shown in FIGURE 2, the free end of the leaf spring 34 is received within the concavity 20 of the offset portion 16 of the base member. This substantially completely relieves the leaf spring of all loading, so that any application of heat to the assembly will have minimum annealing effect upon the spring. This is especially important when an ornament 40 is secured to the base member 12, such as by solder 42. Thus, this construction in addition to providing maximum access for assembly purposes in the open position, minimizes loss of spring tension and annealing of the parts which would otherwise detract from the usefulness of the finished product.

It will also be recognized that the entire clip assembly includes two basic parts, readily assembled, to provide a manually adjustable spring action.

While this invention has been described with particular reference to the construction shown in the drawing, it is to be understood that such is not to be construed as imparting limitations upon the invention, which is best defined by the claims appended hereto.

Having thus described my invention, I claim as new and desire to secure by Letters Patent:

1. A spring clip comprising, in combination, a base member and a pressure member, said base member having mounting means at one end hingedly supporting said pressure member for limited rotational movement thereupon, said pressure member having a portion confronting the opposite end of said base member defining a jaw therewith for receiving a support member therebetween, said base and pressure members including spring means exerting a yieldable pressure upon said jaw, said mounting means including adjustment means for increasing said yieldable pressure upon said jaw to increase the holding strength of said clip upon the support member, said mounting means comprising a pair of laterally spaced apart ears each defining an aperture, said pressure member including a pair of pintles pivotally received within each aperture of said ears, said spring means comprising a leaf spring integral at one end with said pressure member intermediate said pintles, and said base member including an abutment intermediate said ears abutting said leaf spring, each said aperture comprising a slot of greater length than the corresponding dimension of said respective pintle received therewithin, each said slot slidably and rotatably receiving said respective pintle of said pressure member, whereby angular displacement of said pressure member relative to said base member effects displacement of said pintles within said apertures.

2. A spring clip as set forth in claim 1 wherein said slot is inclined in a direction away from said opposite end of said base member.

3. A spring clip comprising, in combination, a base member and a pressure member, said base member having mounting means at one end hingedly supporting said pressure member for limited rotational movement thereupon, said pressure member having a portion confronting the opposite end of said base member defining a jaw therewith for receiving a support member therebetween, said base and pressure members including spring means exerting a yieldable pressure upon said jaw, said mounting means including adjustment means for increasing said yieldable pressure upon said jaw to increase the holding strength of said clip upon the support member, said mounting means comprising a pair of laterally spaced apart ears each defining an aperture, said pressure member including a pair of pintles pivotally received within each aperture of said ears, said spring means comprising a leaf spring integral at one end with said pressure member intermediate said pintles, and said base member including an abutment intermediate said ears abutting said leaf spring, each said aperture comprising a slot slidably and rotatably receiving said respective pintle of said pressure member, whereby angular displacement of said pressure member relative to said base member effects displacement of said pintles within said apertures, said slot being inclined in a direction away from said opposite end of said base member, each of said pintles defining an edge in sliding contact with one side of said respective slot frictionally resisting sliding displacement of said pintles within said slots.

4. A spring clip as set forth in claim 3, wherein said abutment defines an edge in sliding contact with said leaf spring frictionally resisting sliding displacement of said leaf spring relative to said abutment.

References Cited by the Examiner
UNITED STATES PATENTS

| | | | |
|---|---|---|---|
| 2,383,237 | 8/45 | Buick | 63—14.4 |
| 2,668,341 | 2/54 | Arzt | 24—252 |
| 2,764,881 | 10/56 | Evans | 63—14.4 |
| 2,945,363 | 7/60 | Cataldi | 63—14.4 |
| 3,031,864 | 5/62 | Freundlich | 63—14 |

DONLEY J. STOCKING, *Primary Examiner.*